US012724410B2

(12) United States Patent
Liu et al.

(10) Patent No.: US 12,724,410 B2
(45) Date of Patent: Sep. 1, 2026

(54) AUTONOMOUS NAVIGATION METHOD AND SYSTEM FOR INTELLIGENT INDOOR LOGISTIC TRANSPORTATION BASED ON ONE-SHOT IMITATION

(71) Applicant: The Hong Kong University of Science and Technology, Hong Kong (CN)

(72) Inventors: Yuxuan Liu, Hong Kong (CN); Hengli Wang, Hong Kong (CN); Qing Liang, Hong Kong (CN); Peng Yun, Hong Kong (CN); Ming Liu, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 450 days.

(21) Appl. No.: 17/805,149

(22) Filed: Jun. 2, 2022

(65) Prior Publication Data

US 2022/0390951 A1 Dec. 8, 2022

Related U.S. Application Data

(60) Provisional application No. 63/196,229, filed on Jun. 3, 2021.

(51) Int. Cl.
*G05D 1/00* (2024.01)
*G01S 17/931* (2020.01)

(52) U.S. Cl.
CPC .......... *G05D 1/0214* (2013.01); *G01S 17/931* (2020.01); *G05D 1/0088* (2013.01); *G05D 1/0272* (2013.01)

(58) Field of Classification Search
CPC .. G05D 1/0214; G05D 1/0088; G05D 1/0272; G01S 17/931

(Continued)

(56) References Cited

U.S. PATENT DOCUMENTS

2018/0172450 A1* 6/2018 Lalonde ............. G01C 21/3407
2018/0328738 A1* 11/2018 Patel ..................... H04W 4/029

(Continued)

FOREIGN PATENT DOCUMENTS

CN 105336002 A * 2/2016
CN 105867381 A * 8/2016 ........... G05D 1/0217

OTHER PUBLICATIONS

Hecker, S., et al., "End-to-End Learning of Driving Models with Surround-View Cameras and Route Planners," Aug. 6, 2018, pp. 1-23.

(Continued)

*Primary Examiner* — Isaac G Smith
(74) *Attorney, Agent, or Firm* — SALIWANCHIK, LLOYD & EISENSCHENK

(57) ABSTRACT

A method and systems for controlling and directing a means of transportation to autonomously navigate to a target location are provided. The method includes receiving measurements from one or more sensors of the means of transportation; building a route based on the measurement received for the means of transportation to navigate to a target location; generating localization estimation associated with the route built; generating a global path based on the route and the localization estimation; and performing local planning for directing the means of transportation to the target location while avoiding surrounding static or dynamic obstacles. The one or more sensors include a LiDAR sensor and an odometry sensor.

8 Claims, 3 Drawing Sheets

(58) Field of Classification Search
USPC .............................................................. 701/26
See application file for complete search history.

(56) References Cited

U.S. PATENT DOCUMENTS

| | | | | |
|---|---|---|---|---|
| 2022/0057992 | A1* | 2/2022 | Kawasaki | G06N 3/045 |
| 2022/0066456 | A1* | 3/2022 | Ebrahimi Afrouzi | G06F 3/04883 |
| 2022/0107647 | A1* | 4/2022 | Xia | G05D 1/65 |

OTHER PUBLICATIONS

Gao, F., et al., "Teach-Repeat-Replan: A Complete and Robust System for Aggressive Flight in Complex Environments," IEEE Transactions On Robotics, 2020, pp. 1-20.
Cai, P., et al., "Vision-Based Trajectory Planning via Imitation Learning for Autonomous Vehicles," IEEE Intelligent Transportation Systems Conference (ITSC), Oct. 2019, pp. 2736-2742.

* cited by examiner

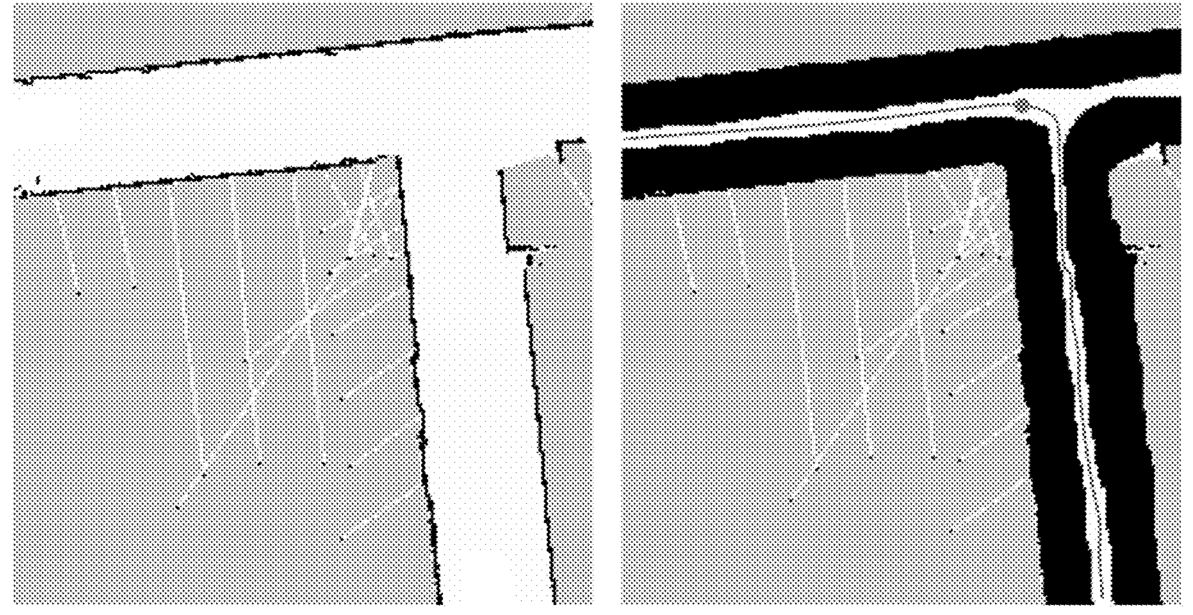
FIG. 3A-3B
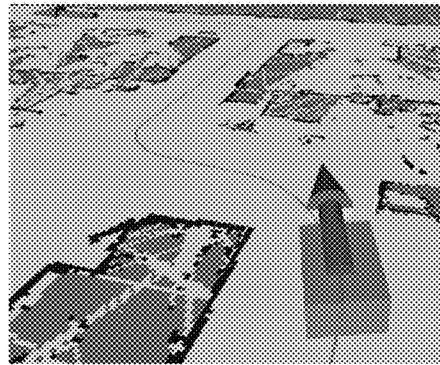
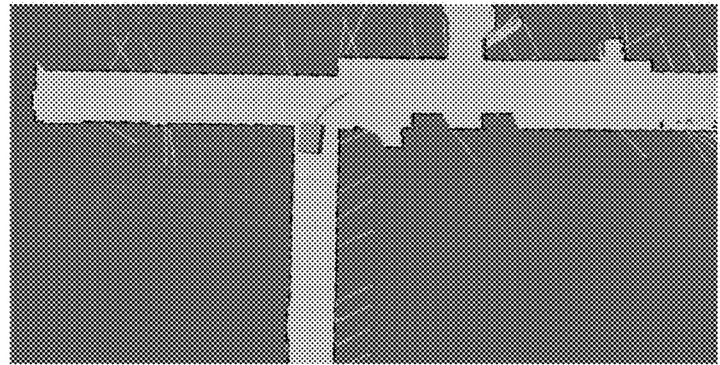
FIG. 4A-4B

AUTONOMOUS NAVIGATION METHOD AND SYSTEM FOR INTELLIGENT INDOOR LOGISTIC TRANSPORTATION BASED ON ONE-SHOT IMITATION

CROSS-REFERENCE TO RELATED APPLICATION

This application claims the benefit of U.S. Provisional Application Ser. No. 63/196,229, filed Jun. 3, 2021, which is hereby incorporated by reference in its entirety including any tables, figures, or drawings.

BACKGROUND OF THE INVENTION

The transportation of goods and elder residents are important aspects of the daily workload of elder caring centers. Currently, caring workers have to manually conduct these assignments. Design of transportation robots and navigation system is the key for meeting the challenges, boosting work efficiency of the caring workers, and enhancing service quality for residents of the elder caring centers.

Traditional path planning algorithms can be divided into search-based algorithms and sampling-based algorithms. The Search-based algorithms, such as A* algorithm, is capable of finding a solution if such a solution exists. On the other hand, the sampling algorithms such as PRM algorithm and RRT* algorithm provide a tradeoff between quality of the planned paths and the operation efficiency. Both the search-based algorithms and the sampling-based algorithms, however, are computationally intensive for three-dimensional (3D) calculations, when the planar orientation is explicitly taken. Further, the traditional path planning algorithms do not run well for two dimensional (2D) calculations when the navigation robots do not move in a perfect circle, causing the navigation robots to perform over-aggressively due to underestimating of the footprints of the robots or fail to find a feasible solution due to overestimating of the footprints of the robots. Accordingly, for a large indoor navigation platform, it is difficult for the existing methods to generate a set of robust parameters for safe and efficient operations.

With development of deep learning and neural network, data-driven imitation framework that learns to output planned paths by imitating the actions of human driving demonstrations has been proposed. For instance, Bansal et al. developed a learning-based autonomous driving system that generated a top-down representation of neighboring maps and target routes. Then the representation was fed into a recurrent neural network (RNN) to output driving trajectories. Cai et al. proposed a purely vision-based system that only relied on camera images to plan a set of plausible safe trajectories for subsequent operations. However, these methods have drawbacks including that the expert drivers are required to drive the navigation robots many times in various or even similar scenes. For instance, the system of Cai took tens of thousands of frames of supervision to teach a mini-car to safely drive in a small fixed field. Therefore, extensive time and labor are required to record expert driving demonstrations for data training purpose. Moreover, the vision-based imitation learning system suffers from generalization problems, since the system takes a large number of variances from the training data to minimize the possibility of failure in unfamiliar scenes or in environments having dynamic obstacles.

BRIEF SUMMARY OF THE INVENTION

There continues to be a need in the art for improved designs and techniques for a method and systems for controlling and directing a means of transportation to autonomously navigate to a target location.

According to an embodiment of the subject invention, an autonomous navigation method comprises receiving measurements from one or more sensors of a means of transportation; building a route based on the measurement received for the means of transportation to navigate to a target location; generating localization estimation associated with the route built; generating a global path based on the route and the localization estimation; and performing local planning for directing the means of transportation to the target location while avoiding surrounding static or dynamic obstacles. The one or more sensors comprise a LiDAR sensor and an odometry sensor. The building a route comprises generating a map by applying a Gmapping method to the measurements. The generating a map by applying a Gmapping method comprises learning from results of expert driving demonstrations that include demonstrated safe positions spaced apart from static obstacles by predetermined distances; treating the safe positions as a plurality of safe and achievable nodes in a discretized 3D pose space; deriving from the results of expert demonstrations a plurality of sparse 3D points in 3D pose spaces as safe points; and saving only connected poses as a sparse graph. Moreover, the generating localization estimation comprises fusing measurements of the one or more sensors to obtain incremental poses; and evaluating the poses based on likelihood of point cloud measurements based on particle pose and the map. The fusing results of the one or more sensors to obtain incremental poses is performed by a particle filter framework. Further, the generating a global path is performed by applying a dynamic programming method to the saved graph. The performing local planning comprises randomly sampling multiple input sequences as a prediction of actions to be taken by the means of transportation; computing positions and footprints to determine if an action sequence is taken by the means of transportation; filtering out trajectories causing a collision between the means of transportation and the surrounding obstacles; computing a synthetic score considering how close the system is spaced apart from a global path and how faraway future footprints are spaced apart from local obstacles based on remaining trajectories; and selecting an optimal trajectory and if no optimal trajectory is selected, switching into a recovery mode. When being in the recovery mode, adopting a clear-and-wait policy to wait for an obstacle to disappear or to be removed while moving slightly to stay away from the obstacle.

In certain embodiment of the subject invention, an autonomous navigation system is provided, comprising a sensory module; a demonstration module; a computing module; and a visualization module. The sensory module comprises at least one light detection and ranging (LiDAR) sensor and at least one odometry sensor. Moreover, the demonstration module comprises a simultaneous localization and mapping (SLAM) unit and a route building unit to which the SLAM unit is coupled. The computing module comprises a localization unit, a global planning unit, a local replanning unit, and a control unit, the localization unit is coupled to the global planning unit, the global planning unit is coupled to the local replanning unit, and the local replanning unit is coupled to the control unit. The visualization module comprises a monitor unit, the visualization module respectively receiving inputs from the demonstration module and the computing module.

In some embodiments of the subject invention, a non-transitory computer readable medium having stored therein program instructions executable by a computing system to cause the computing system to perform a method is provided. The method comprises receiving measurements from one or more sensors of a means of transportation; building a route based on the measurement received for the means of transportation to navigate to a target location; generating localization estimation associated with the route built; generating a global path based on the route and the localization estimation; and performing local planning for directing the means of transportation means to the target location while avoiding static or dynamic surrounding obstacles. Moreover, the building a route comprises generating a map by applying a Gmapping method to the measurements. The generating a map by applying a Gmapping method comprises learning from results of expert driving demonstrations that include demonstrated safe positions spaced apart from static obstacles by predetermined distances; treating the safe positions as a plurality of safe and achievable nodes in a discretized 3D pose space; deriving from the results of expert demonstrations a plurality of sparse 3D points in 3D pose spaces as safe points; and saving only connected poses as a sparse graph. Further, the generating localization estimation comprises fusing results of the one or more sensors to obtain incremental poses; and evaluating the poses based on likelihood of point cloud measurements based on particle pose and the map. The fusing results of the one or more sensors to obtain incremental poses is performed by a particle filter framework. The generating a global path is performed by applying a dynamic programming method to the saved graph.

BRIEF DESCRIPTION OF THE DRAWINGS

FIGS. 3A-3B show results of the route building by the autonomous navigation method and systems, according to an embodiment of the subject invention.

FIGS. 4A-4B show visualization of the planners of the autonomous navigation method and systems, according to an embodiment of the subject invention.

DETAILED DISCLOSURE OF THE INVENTION

The embodiments of subject invention pertain to an autonomous navigation method and systems based on one-shot imitation for generating safe navigate routes to travel to a target location given a one-shot demonstration.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not prelude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
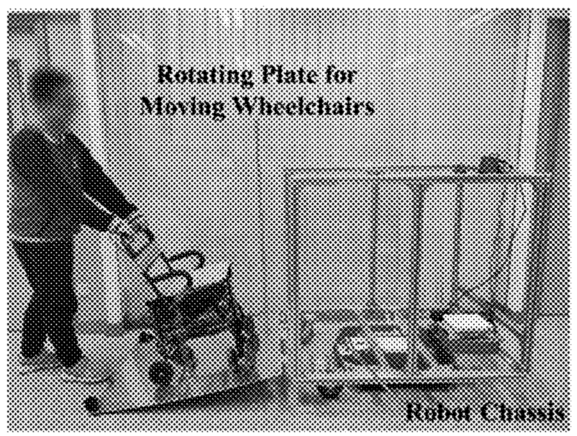
FIG. 1 shows images of exemplary embodiments of the autonomous navigation system, according to an embodiment of the subject invention.
Figure 1:
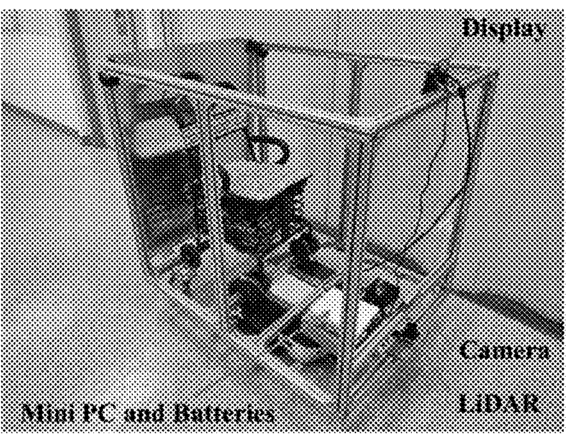

As illustrated in FIG. 1, a prototype of the autonomous navigation system is built upon a moving base to form the main chassis of the autonomous navigation system for carrying a wheelchair with a human sitting thereon. The autonomous navigation system may comprise a rotating plate attached to the system with a rotation joint, allowing a user to push the wheelchair onto the chassis. The platform has a dimension of about 1.2 meters in length and about 0.9 meters in width to fit into corridors of most eldercare centers.

Figure 2:
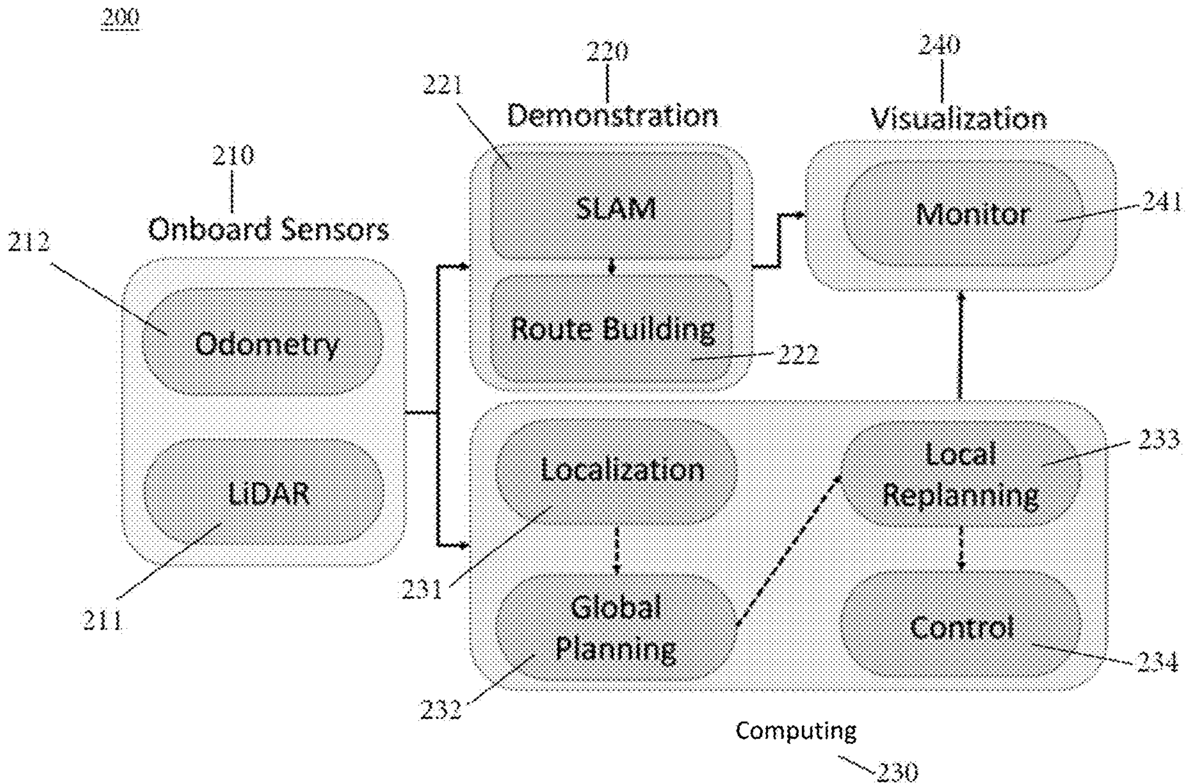
FIG. 2 is a schematic representation of the autonomous navigation method and systems, according to an embodiment of the subject invention.

Referring to FIG. 2, the autonomous navigation system 200 comprises a sensory module 210 coupled to a demonstration module 220 and a computing module 230. The sensory module 210 comprises a light detection and ranging (LiDAR) sensor 211 and an odometry sensor 212; the demonstration module 220 comprises a simultaneous localization and mapping (SLAM) unit 221 and a route building unit 222; and the computing module 230 comprises a localization unit 231, a global planning unit 232, a local replanning unit 233, and a control unit 234.

Moreover, the autonomous navigation system 200 may include a visualization module 240 coupled to the demonstration module 220 and the computing module 230 for receiving the outputs of the demonstration module 220 and the computing module 230 and displaying the outputs on a monitor unit 241 of the visualization module 240.

During the expert driving demonstration phase, the autonomous navigation system runs the simultaneous localization and mapping (SLAM) 221 with Gmapping methods. When the expert driving demonstration phase is completed, the autonomous navigation system can be configured to build a route based on the passed-through points and create a graph-based data structure that saves the route.

Then, during the run time phase, a global path is built based on the saved route. Further, the local replanning and a reset recovery policy are integrated to compute local actions in real-time for the autonomous navigation system 200 to operate in dynamic environments. As a result, the autonomous navigation system can autonomously travel from a starting point to a target location, given only a one-shot expert driving demonstration.

The details of the autonomous navigation method and systems are described below.

1. Route Building

The LiDAR and odometry each collects measurements, such as ranges, distance, or position changes in relative to some known position, during the expert driving demonstrations of the autonomous navigation method and systems. Then, the Gmapping method is applied to the measurements collected by the LiDAR and odometry to generate a map. As shown in FIGS. 3A-3B, the resulted maps demonstrate positions of obstacles such as walls of the environment in which the autonomous navigation system/method operates.

In the traditional technology, an expansion method is applied to the maps that have obstacles before running the planning methods. However, because most navigation robots are not formed with shapes of perfect circles and dimensions of the robots are only marginally smaller than the distances between the adjacent obstacles such as walls, it is extremely challenging for the traditional navigation system to find a post-processing method to produce a costmap that could correctly generate safe and feasible paths for the navigation robots to travel along. For instance, when a traditional search-based method such as A* method is directly applied to the map having obstacles, paths generated may cause the autonomous navigation system to move too close to the obstacles.

In embodiments of the subject invention, the autonomous navigation method and systems adopt machine learning to learn from the results of the expert driving demonstration. The demonstrated positions of the expert driving are deemed safe positions which are spaced apart from the static obstacles such as walls by predetermined safe distances. Accordingly, the safe positions are stored as a list of safe and achievable nodes in discretized 3D pose spaces. Further, it is assumed that the linear interpolations of the consecutive safe poses are also safe. As a result, a series of sparse 3D points in 3D pose spaces which are deemed safe points can be derived from the results of the expert driving demonstration. Nevertheless, since it takes a significant amount of time and memory to save the entirety of the 3D pose space, only the connected poses are saved as a sparse graph. By downsampling the 3D pose spaces back to a 2D pose, new costmaps are generated as shown in FIGS. 4A and 4B to facilitate the global planner to create a safer route.

2. Localization

The localization step can be carried out by a particle filter framework. Incremental poses are generated by fusion of measurements from the encoder odometry and the iterative closest point (ICP) results from the LiDAR point cloud.

Then, the poses are evaluated based on the likelihood of the point cloud measurements given the particle pose and the map. The fusion framework can produce a robust localization estimation even when the measurements of the odometry are not sufficiently accurate. Accordingly, the robust and correct localization estimation results provide a basis for performing subsequent global planning step and local planning step.

3. Global Planning

Given a target location, the global planner is configured to produce a global path based on the saved graph. To make full use of the graph created by the expert driving demonstration, a dynamic programming method is adopted for searching the graph. Since the dynamic programming method is complete in this setting, it can always find a solution when such a solution exists. As a result, the autonomous navigation method and systems are able to find a solution if the target location is in the safe region of the expert driving demonstration. By applying the dynamic programming method, the autonomous navigation method and systems efficiently recompute the global plan if there are any changes in the autonomous navigation system's estimated positions, making performance of the autonomous navigation method and system more robust.

4. Local Replanning

Local replanning is a critical step for keeping the autonomous navigation system away from dangerous dynamic/unexpected obstacles. First, the current measurements of the LiDAR sensor are obtained as inputs. Then, multiple input sequences are randomly sampled for predicting the actions to be taken by the autonomous navigation method and systems. Further, the positions and the footprints of the autonomous navigation method and systems are computed to determine whether these action sequences are to be taken. Next, the trajectories with the LiDAR sensor measurements that may cause a collision are filtered out. Based on all the remaining trajectories, a synthetic score is computed considering how close the system is spaced apart from the global path and how far away future footprints are spaced apart from the local obstacles. Then, the optimal trajectory is determined as an output of the local replanning. Nevertheless, if no safe optimal trajectories can be determined after multiple samplings, the autonomous navigation method and systems will be switched into a recovery mode.

5. Recovery Mode

To stay away from surrounding obstacles, a rotation-and-clear policy is generally adopted by the traditional methods to rotate the navigation robot. However, it is dangerous for a platform having a sizable dimension to rotate in place, especially with humans sitting on the platform.

Therefore, in embodiments of the subject invention, a clear-and-wait policy is adopted through which the autonomous navigation method and systems wait for the obstacles to disappear or to be removed while moving slightly forward and backward to stay away from the obstacles. As a result, higher level of safety for navigation can be achieved when the autonomous navigation method and systems run in the recovery mode.

6. Integration Framework

Figure 5:
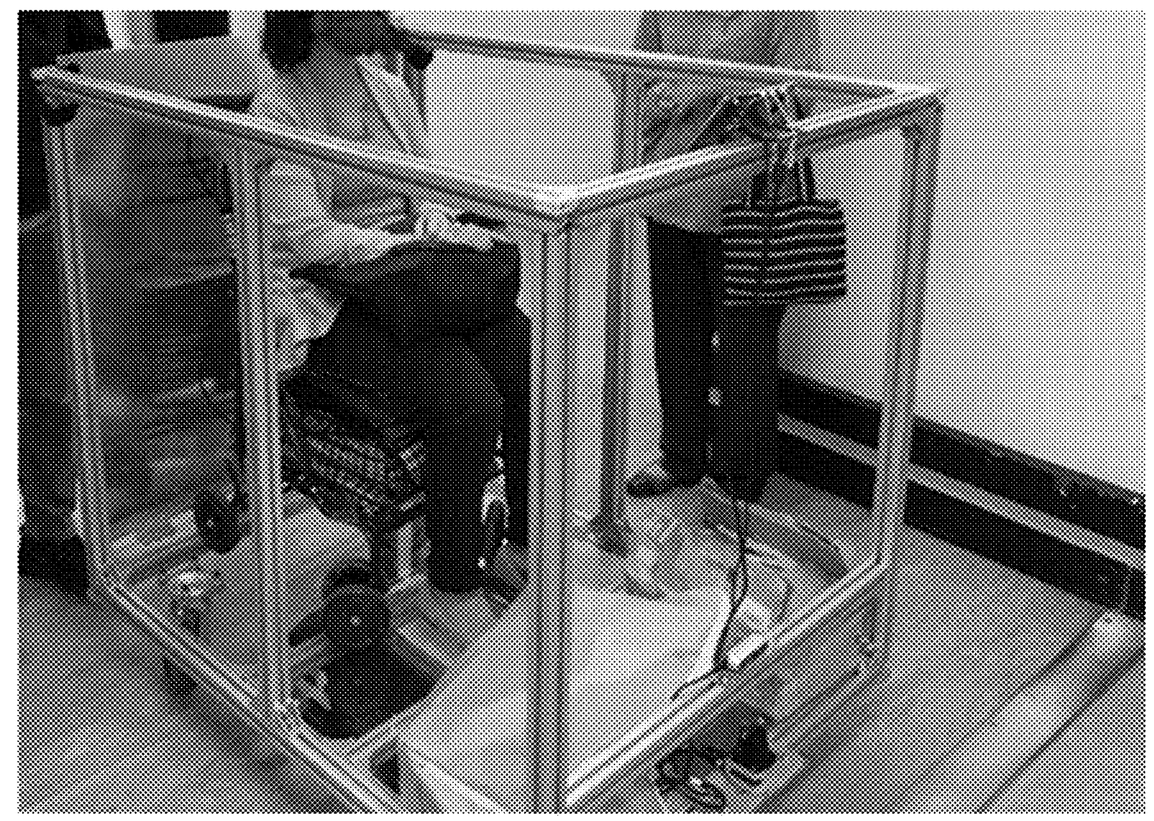
FIG. 5 shows images of testing of the autonomous navigation system loaded with a manned wheelchair, according to an embodiment of the subject invention.

The autonomous navigation method and systems have an integrated framework with fully functional one-shot imitation for improving transportation efficiency in an indoor environment. After one round of human driving the system around the targeted environment, the autonomous navigation method and systems are configured to build maps and determine the routes based on analysis of the environment. Given a target position in the environment, the autonomous navigation method and systems can safely navigate by imitating the expert driving demonstration while avoiding dynamic obstacles on its way. The smoothness of the autonomous navigation may even surpass human driving demonstration since operation optimizations are performed during the local replanning process. FIG. 5 shows images of a driving test conducted by the autonomous navigation method and systems with a human sitting on the system.

The embodiments of the subject invention provide following key advantages:

1. an autonomous navigation method and systems based on a one-shot imitation framework that learn once from human demonstration and repeat/replan in various dynamic environments;
2. a framework integrating localization, planners and policies into one robust and safe navigation method and system; and 3. a platform for safely transporting human or goods with minimum operations by a user with improved efficiency and better service quality for the user.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A navigation method for improving efficiency and safety of indoor logistic transportation based on an autonomous means of transportation, the method implemented by a computing system coupled to a LiDAR sensor and an odometry sensor, the method comprising:

receiving, by the computing system, real-time geometric measurements from the LiDAR sensor and incremental pose measurements from the odometry sensor of the means of transportation;

constructing, by the computing system, a navigable sparse graph of a three dimensional (3D) pose space based on an expert driving demonstration, the constructing comprising:

(1) applying a method to the received measurements to generate a map of an indoor environment, the map indicating positions of static obstacles;

(2) identifying, from the expert driving demonstration, safe positions of the means of transportation, each safe position being spaced apart from static obstacles by a predetermined safe distance;

(3) treating the identified safe positions as a plurality of safe and achievable nodes in a discretized 3D pose space;

(4) deriving a plurality of sparse 3D points in the 3D pose space as safe points based on linear interpolations of consecutive safe poses; and (5) saving only connected poses as the navigable sparse graph, thereby generating a costmap optimized for safe navigation within the physical constraints of the means of transportation in the indoor environment;

generating, by the computing system, a robust localization estimation of the means of transportation's current pose within the generated map, the generating comprising:

(1) fusing the real-time geometric measurements from the LiDAR sensor and the incremental pose measurements from the odometry sensor using a particle filter framework to obtain incremental poses; and (2) evaluating the obtained incremental poses based on a likelihood of point cloud measurements given a particle pose and the generated map, thereby providing accurate and real-time positional data for autonomous movement in dynamic indoor settings, even with odometry inaccuracies;

determining, by the computing system, a global path from a current location to a target location within the indoor environment by applying a dynamic programming method to the navigable sparse graph, the dynamic programming method configured to efficiently re-compute the global plan in response to changes in the means of transportation's estimated position, thereby ensuring adaptable and continuous long-range planning based on learned safe routes; and executing, by the computing system, real-time local planning commands for directing the means of transportation along the global path while dynamically avoiding surrounding static or dynamic obstacles, the executing comprising:

(1) randomly sampling a plurality of input sequences as a prediction of future actions to be taken by the means of transportation;

(2) computing predicted positions and spatial boundaries of the means of transportation for each of the randomly sampled plurality of input sequences;

(3) filtering out trajectories causing a collision between the means of transportation and the surrounding obstacles based on current LiDAR measurements;

(4) computing a synthetic score for remaining trajectories, the score considering proximity to the global path and spacing from local obstacles;

(5) determining whether an optimal trajectory exists among the remaining trajectories that maximizes the synthetic score for guiding the means of transportation and selecting the optimal trajectory if it exists; and (6) if no optimal trajectory exists, activating a recovery mode by adopting a clear-and-wait policy to wait for an obstacle to disappear or be removed while moving slightly to stay away from the obstacle, thereby enhancing the safety and navigability of the means of transportation in unpredictable indoor environments.

2. The navigation method of claim 1, wherein the applying a method to the received measurements to generate a map of an indoor environment is applying a Gmapping method to the received measurements to generate a map of an indoor environment.

3. The navigation method of claim 1, wherein the fusing the real-time geometric measurements from the LiDAR sensor and the incremental pose measurements from the odometry sensor to obtain incremental poses is performed by a particle filter framework.

4. The navigation method of claim 1, wherein the method applied to the navigable sparse graph in the step of determining, by the computing system, a global path from a current location to a target location within the indoor environment, is a dynamic programming method.

5. A non-transitory computer readable medium having stored therein program instructions executable by a computing system to cause the computing system to perform a method, the method comprising:

receiving, by the computing system, real-time geometric measurements from the LiDAR sensor and incremental pose measurements from the odometry sensor of the means of transportation;

constructing, by the computing system, a navigable sparse graph of a three dimensional (3D) pose space based on an expert driving demonstration, the constructing comprising:

(1) applying a method to the received measurements to generate a map of an indoor environment, the map indicating positions of static obstacles;

(2) identifying, from the expert driving demonstration, safe positions of the means of transportation, each safe position being spaced apart from static obstacles by a predetermined safe distance;

(3) treating the identified safe positions as a plurality of safe and achievable nodes in a discretized 3D pose space;

(4) deriving a plurality of sparse 3D points in the 3D pose space as safe points based on linear interpolations of consecutive safe poses; and (5) saving only connected poses as the navigable sparse graph, thereby generating a costmap optimized for safe navigation within the physical constraints of the means of transportation in the indoor environment;

generating, by the computing system, a robust localization estimation of the means of transportation's current pose within the generated map, the generating comprising:

(1) fusing the real-time geometric measurements from a LiDAR sensor and the incremental pose measurements from an odometry sensor using a particle filter framework to obtain incremental poses; and (2) evaluating the obtained incremental poses based on a likelihood of point cloud measurements given a particle pose and the generated map, thereby providing accurate and real-time positional data for autonomous movement in dynamic indoor settings, even with odometry inaccuracies;

determining, by the computing system, a global path from a current location to a target location within the indoor environment by applying a dynamic programming method to the navigable sparse graph, the dynamic programming method configured to efficiently re-compute the global plan in response to changes in the means of transportation's estimated position, thereby ensuring adaptable and continuous long-range planning based on learned safe routes; and executing, by the computing system, real-time local planning commands for directing the means of transportation along the global path while dynamically avoiding surrounding static or dynamic obstacles, the executing comprising:

(1) randomly sampling a plurality of input sequences as a prediction of future actions to be taken by the means of transportation;

(2) computing predicted positions and spatial boundaries of the means of transportation for each of the randomly sampled plurality of input sequences;

(3) filtering out trajectories causing a collision between the means of transportation and the surrounding obstacles based on current LiDAR measurements;

(4) computing a synthetic score for remaining trajectories, the score considering proximity to the global path and spacing from local obstacles;

(5) determining whether an optimal trajectory exists among the remaining trajectories that maximizes the synthetic score for guiding the means of transportation and selecting the optimal trajectory if it exists; and (6) if no optimal trajectory exists, activating a recovery mode by adopting a clear-and-wait policy to wait for an obstacle to disappear or be removed while moving slightly to stay away from the obstacle, thereby enhancing the safety and navigability of the means of transportation in unpredictable indoor environments.

6. The non-transitory computer readable medium of claim 5, wherein the applying a method to the received measurements to generate a map of an indoor environment is applying a Gmapping method to the received measurements to generate a map of an indoor environment.

7. The non-transitory computer readable medium of claim 5, wherein the fusing the real-time geometric measurements from the LiDAR sensor and the incremental pose measurements from the odometry sensor to obtain incremental poses is performed by a particle filter framework.

8. The non-transitory computer readable medium of claim 5, wherein the method applied to the navigable sparse graph in the step of determining, by the computing system, a global path from a current location to a target location within the indoor environment, is a dynamic programming method.

* * * * *